C. W. YOUNG.
SKINNING TOOL.
APPLICATION FILED MAR. 6, 1920.
1,379,153. Patented May 24, 1921.
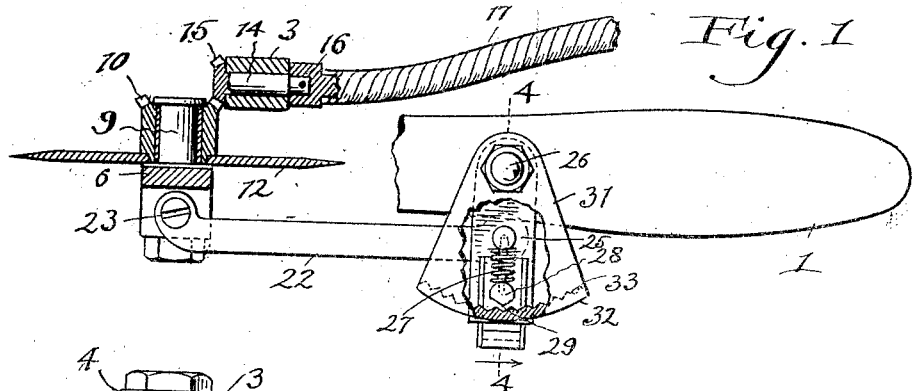
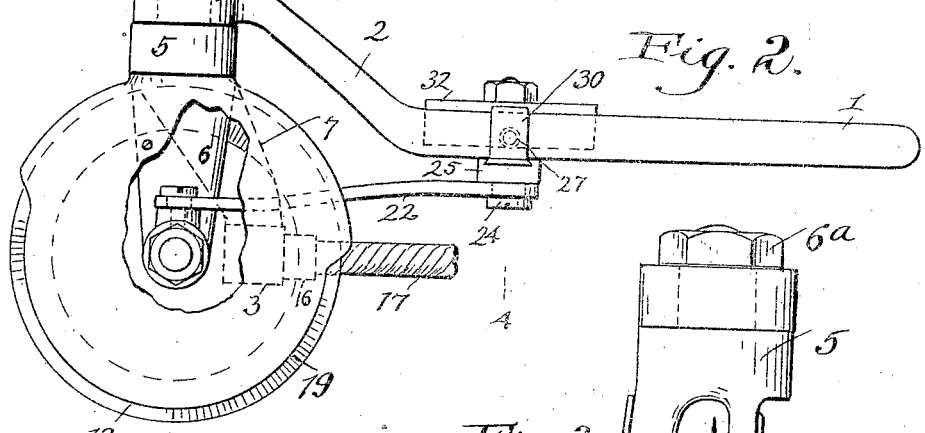
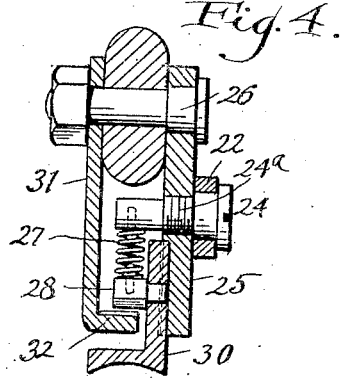
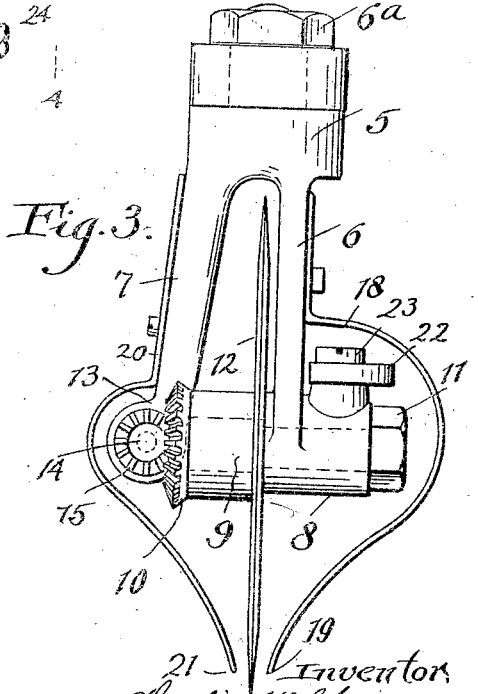
Inventor
Charles W. Young.

UNITED STATES PATENT OFFICE.

CHARLES W. YOUNG, OF CLEVELAND, OHIO.

SKINNING-TOOL.

1,379,153.  Specification of Letters Patent.  Patented May 24, 1921.

Application filed March 6, 1920. Serial No. 363,860.

*To all whom it may concern:*

Be it known that I, CHARLES W. YOUNG, a citizen of the United States, residing at Cleveland, in the county of Cuyahoga and State of Ohio, have invented a certain new and useful Improvement in Skinning-Tools, of which the following is a full, clear, and exact description.

This invention relates to a cutting tool which is particularly designed for use as a skinning tool, that is to say a skinning tool for use in cutting the hide or skin from the carcass of an animal.

At the present the practice in an abattoir in removing the hide from animals is to employ a straight bladed knife with which the operator cuts the skin away from the carcass of the animal. Using a knife of this type it is a very easy matter for the knife to slip and cut a hole in the skin which takes away considerable value from the price at which the skin may be sold.

The tool which forms the subject matter of this application is power driven and is provided with certain guard features which very largely eliminate the possibility of cutting a hole in the skin as it is being removed, particularly in the hands of a skilled operator.

Reference should be had to the drawings forming a part of this specification in which Figure 1 is a top plan view; Fig. 2 is a side elevation; Fig. 3 is a front elevation and Fig. 4 is a section on the line 4—4 of Fig. 2.

The tool comprises a support which has a handle 1 that is adapted to be grasped by the hand of the user. This handle is shaped very similar to the wooden handle which is customarily used as a mounting for a steel bladed knife. Extending from the handle is a neck portion 2 which is bent out of plane with the handle 1 as indicated in Fig. 2. The portion 2 has a head 3 which extends substantially in a plane parallel with the handle and is provided with an opening which is indicated in dotted lines at 4 in Fig. 2. Coöperating with the head 3 is a bracket 5. This bracket has a top portion which engages with the under surface of the head 4. The top of the bracket 5 has a short extension or spindle which extends through the opening 4 in the head 3. This spindle is threaded at the end thereof and receives a nut 6ª by which the bracket 5 is secured to the head 3 in such fashion that the bracket 5 may be moved in an angular direction with respect to the head 3. The bracket has two arms, one of which is indicated at 6 and the other which is indicated at 7. The arm 6 at its lower end is provided with a hub 8 through which extends a shaft indicated in dotted lines in Fig. 3. This shaft at one end carries a beveled gear 10 and at its opposite end is threaded to receive a nut 11, the nut serving to hold the shaft 9 in its bearing. Upon the shaft 9 there is mounted a circular cutter blade 12 so that the blade 12 is rotated by rotation of the shaft 9. The lower end of the arm 7 is provided with a hub 13 through which there extends a short shaft 14. This shaft at its end carries a beveled gear 15 which meshes with the gear 10. The end of the shaft 14 has secured thereto a member 16 through which the shaft 14 may be driven and this same member also serves to position the shaft 14 so that it is held within the hub 13 in a manner to prevent movement of the shaft 14 within its bearing, other than rotary movement. To the member 16 there is secured a flexible driving shaft 14 which may be connected to any suitable source of power such as an electric motor which is not shown.

Mounted upon the member 6 is a shield 18. This shield has an outward extending portion which encircles and incloses the hub 8 and at its lower portion has a substantially annular edge as indicated at 19 which is of a radius the same as the radius of the cutting disk 12. The edge 19 is spaced away from the cutting tool for a slight distance and furthermore the edge of the cutting blade 12 extends slightly beyond the edge 19.

Mounted upon the member 7 is a second cover and guide plate indicated at 20. This plate has an outwardly extending portion which incloses the hub 13 and also incloses the gears 10 and 15. The lower portion of this cover 20 extends inwardly toward the cutting member 12 and the lower edge 14 is positioned with respect to the periphery of the cutting member 12 in substantially the same manner as is the edge 19 of the cover member 18. These cover members 18 and 20 inclose not only the driving mechanism but also inclose the cutter 12 except a portion of the cutting edge of the cutter which must necessarily be exposed in order to permit usage of the tool.

In using the tool one of the cover members 18 or 20 is always in engagement with the carcass of the animal which is being skinned and the other of the plates is in engagement with the skin which is being removed so that the skin is always being pushed away from the carcass as the cutting tool is used and as the cutting tool is used the skin is always pushed back away from the cutter and hence there is a minimum chance for the skin being cut and so injured if any reasonable degree of care is exercised in operating the cutting tool.

It will be obvious that a cutting tool of the character described enables a much more rapid removal of the skin from a carcass than is possible with the usual straight bladed steel knife.

In removing the skin from a carcass it is frequently desirable to adjust the position of the cutting blade 12 with respect to the handle 1. This is particularly true in cutting around portions of the carcass where the knife must be worked around sharply curved portions such as around the legs of the animal.

For the purpose of providing such an adjustment the bracket 5 is pivotally mounted as before explained. The cutting knife is held in the angular position to which it is adjusted by means of a lever 22 which is pivotally mounted as indicated at 23 upon the hub 8. This lever extends back toward the handle and is pivotally mounted upon a stub member 24, a portion of which is threaded at 24ª and occupies a threaded opening in a member 25 which is pivotally mounted upon the handle by means of a bolt-like member 26. The inner end of the member 25 engages with and forms an abutment for one end of the spring 27, which spring at its outer end engages with a pawl 28 that has an edge 29. The pawl 28 is carried upon a finger member 30 which is slidably mounted in the lower end of the pivoted member 25.

Clamped upon the handle 1 is a plate member 31 which at its lower end has an inturned flange 32 which is of circular configuration and upon its inner surface is provided with teeth 33 which teeth are adapted to be engaged by the pawl member 28. It will be obvious that when the member 28 is engaged by the finger of the user of the tool the member 30 may be pushed forward or moved backward, which will in turn swing the lever 25 about its pivot and the pawl 28 will ride along the teeth 33. This action will move the rod 22 which in turn will cause the bracket 5 to be moved about its pivoted connection with the head 3. The member 30 is moved to the extent required to produce the desired angular position of the cutting blade 12 and when the member 30 is released the pawl 20 holds the parts which have just been described in their adjusted position.

It will be apparent from the description that the annular adjustment of the cutting blade 12 with respect to the handle may be readily accomplished without any inconvenience to the operator.

Having described my invention, I claim

1. A skinning tool comprising a handle having an extension, a forked bracket pivotally mounted upon said extension, a cutting disk mounted between the forks of said bracket and means for driving the cutting disk.

2. A skinning tool comprising a support having a handle, a bracket pivotally mounted on said support, a cutting disk mounted for rotation upon said bracket, driving elements mounted in the bracket by which the tool is driven, means for rotating said driving elements and means operable from the handle for positively moving the pivoted bracket about its pivot and holding the bracket in adjusted angular position with respect to the handle.

3. A skinning tool comprising a support having a handle, a bracket pivotally mounted on said support, a cutting disk mounted for rotation upon said bracket, driving elements mounted in the bracket by which the tool is driven, means for rotating said driving elements and means for moving the said bracket about its pivot and holding it in adjusted position.

4. A skinning tool comprising a support having a handle, a bracket pivotally mounted on said support, a cutting disk mounted for rotation upon said bracket, driving elements mounted in the bracket by which the tool is driven, means for rotating said driving elements and means connected with said bracket and mounted upon the support adjacent the handle for moving the said bracket about its pivot and hold it in adjusted position.

5. A skinning tool comprising a support having a handle, a bracket mounted upon said support, spaced depending members from said bracket, hubs carried at the ends of each of said depending members, a shaft extending through each of said hubs, meshing gears mounted upon the said shafts, a cutting element mounted upon one of said shafts and means for driving the other of said shafts.

6. A skinning tool comprising a support having a handle, a bracket pivotally mounted upon said support, spaced depending members from said bracket, hubs carried at the ends of each of said depending members, a shaft extending through each of said hubs, meshing gears mounted upon the said shafts, a cutting element mounted upon one of said shafts and means for driving the other of said shafts, means for moving the said bracket about its pivot and holding it in adjusted position.

In testimony whereof, I hereunto affix my signature.

CHARLES W. YOUNG.